United States Patent [19]
Howe

[11] 3,737,210
[45] June 5, 1973

[54] MULTILAYER FILTER BASED ON SUBSTITUTION OF HERPIN EQUIVALENT LAYERS IN A ANTIREFLECTION COATING FORMULA

[75] Inventor: James D. Howe, Fairport, N.Y.

[73] Assignee: Bausch Lomb Incorporated, Rochester, N.Y.

[22] Filed: Mar. 31, 1972

[21] Appl. No.: 239,895

[52] U.S. Cl. ...................................................350/166
[51] Int. Cl. ...............................................G02b 5/28
[58] Field of Search.........................350/1, 164, 165, 350/166; 117/33.3

[56] References Cited

OTHER PUBLICATIONS

Young et al., "Applied Optics", Vol. 5, No. 1, Jan. 1966, pp. 77–80

Berning, "Jour. of the Optical Society of America", Vol. 52, pp. 431–436, April 1962

Primary Examiner—Ronald L. Wibert
Assistant Examiner—Ronald J. Stern
Attorney—Frank C. Parker and John E. Leonarz

[57] ABSTRACT

A filter comprises a plurality of thin films of alternating materials arranged in a periodic pattern wherein various symmetrical periods define a stopband and have equivalent indices and thicknesses in the passbands determined by adjusting the ratio $q$ of layer thicknesses within the period, the equivalent indices being chosen to correspond to a known antireflecting coating in the passband, while holding the sum $\sigma$ of the effective layer thicknesses constant for each period.

2 Claims, 5 Drawing Figures

MULTILAYER FILTER BASED ON SUBSTITUTION OF HERPIN EQUIVALENT LAYERS IN A ANTIREFLECTION COATING FORMULA

BACKGROUND OF THE INVENTION

1. Field of the Invention

The invention lies in the field of radiation filters and more particularly in the field of those filters comprising a plurality of layered thin films chosen for the property of being selective of particular portions of the spectrum for transmission and blocking or reflection of radiation.

2. Description of the Prior Art

The reader is assumed to be familiar with Herpin's theorem; Epsteins's discussion thereof, "The Design of Optical Filters," 42 J.O.S.A. 806, November 1952; Berning's further development of the application of Herpin's theorem to multilayer design, "Use of Equivalent Films in the Design of Infrared Multilayer Antireflection Coatings", 52 J.O.S.A. 431, April 1962; Baumeister's "Design of Multilayer Filters by Successive Approximations," 48 J.O.S.A. 955, December 1958; and the discussion by Young & Cristal "On a Dielectric Multilayer (Filter) . . . by Baumeister, "5 Applied Optics 77, January 1966, wherein the suggestion is made (at p. 79) to find the individual layer thicknesses by taking an idealized four-layer antireflection coating and substituting a symmetrical Herpin equivalent layer for each of the four idealized layers.

Other material of interest is in Thelen, "Equivalent Layers in Multilayer Filters," 56 J.O.S.A. 1533, November 1966, and Thelen, "Design of Optical Minus Filters," 61 J.O.S.A., March 1971, and see generally, Macleod, "Thin Film Optical Filters," American Elsevier, New York, 1969, and Hass and Thun, "Physics of Thin Films," Vol. 2, Academic, New York, 1964.

SUMMARY OF THE INVENTION

Typically the specifications for a filter include the wavelengths to be stopped and the permissible maximum transmission in those wavelengths, as well as the wavelengths to be passed and their permissible minimum transmission.

Two materials are chosen according to the designer's experience, one of relatively high refractive index and one of relatively low refractive index, for their absence of absorption in the passband. They may be absorptive in the stopband if no reflective requirement is specified there.

The designer further chooses an antireflection coating formula which he knows from experience to be productive of substantially the desired transmission in one or more passbands. The formula is typically stated as a mathematical relationship among certain refractive indices of the various layers constituting the coating, as well as of the incident and exit massive media, for example:

$$n_1 n_4 = n_3 \sqrt{n_s n_0};$$

wherein $n$ is an actual refractive index, the subnumerals refer to the respective layers, $n_s$ is the index of the substrate and $n_0$ is the index of the incident material. Each layer's thickness is one-quarter or an odd multiple of one-quarter of the passband design wavelength $\lambda_p$.

Using Berning's notation, a ray's electric vector may be said to have changed by a phase angle $\phi$ while traversing a layer of a given geometric thickness and refractive index, and symmetrical periods of at least two alternating materials, 1 and 2, may be described by their values $q$ and $\sigma$, where $$q = 2\phi_1/\phi_2, \text{ and}$$
$$\sigma = 2\phi_1 + \phi_2$$

$\phi_1$ is the phase change through an outer layer of material 1 and $\phi_2$ is the phase change through the single inner layer of material 2.

The invention may be applied to periods of the kind made up not only of two materials, but also those having three or more, in which case the value of $\sigma$ is established by summing the phase changes $\phi_i$ due to the intermediate layers, together with the $\phi_1$ and $\phi_2$ quantities.

Such symmetrical periods have effective optical indices N and optical thicknesses $\gamma$ which are dispersive, especially close to the stopband. The effective optical indices $N_{\lambda_p}$ and optical thicknesses $\gamma_{\lambda_p}$ are expressed at their specific values for a passband design wavelength $\lambda_p$. When $\sigma$ is held constant (for example at $\lambda_p/4$) the value $q$ may be varied to effect changes in the effective optical index $N_{\lambda_p}$ of a period. This is done by changing the relative thicknesses $\phi_1$ and $\phi_2$.

To design a filter according to the invention, a plurality of periods are postulated from the two chosen materials and, with $\sigma$ held constant, the ratios $q$ of the periods are adjusted to produce effective indices N for each period corresponding to the refractive indices $n$ of the chosen antireflection formula.

DESCRIPTION OF A PREFERRED EMBODIMENT

Figure 1:
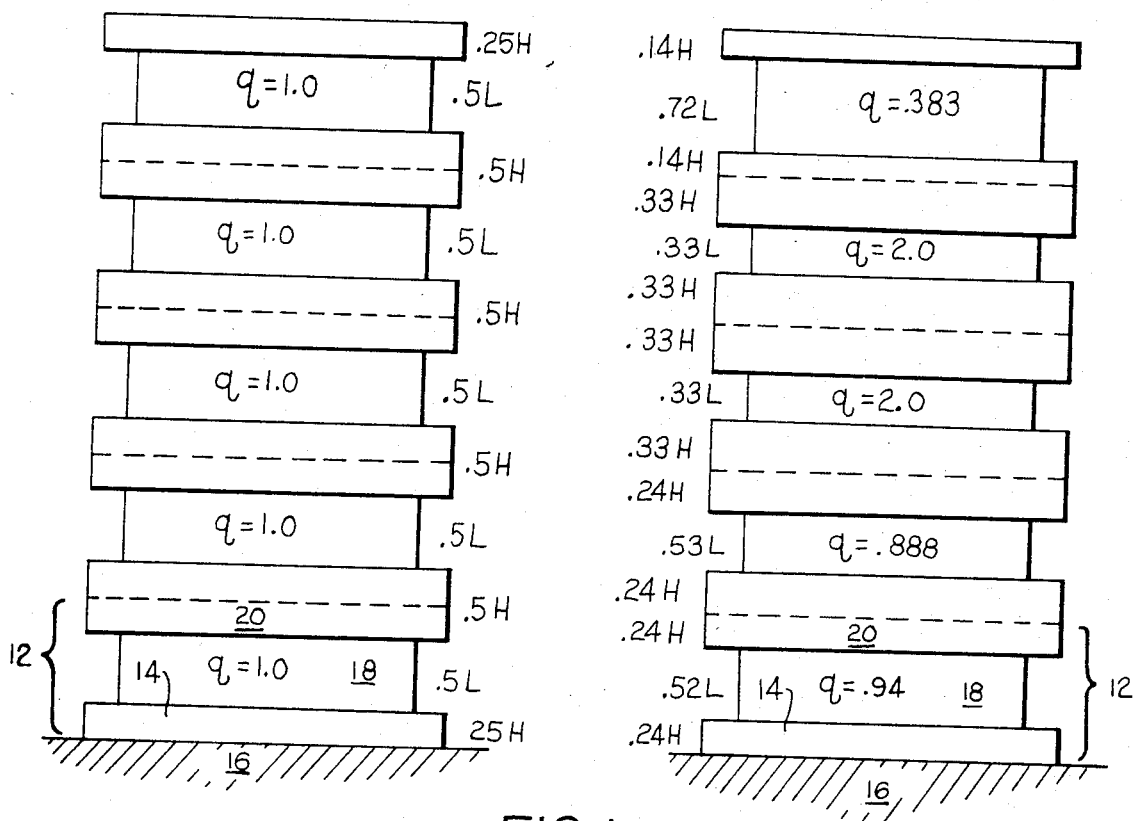
FIG. 1 is a diagram of a greatly magnified cross-section of a first postulate and a final coating according to the invention.

Assume that a filter is to stop 97 percent of light for wavelengths $\lambda$ where $2.5 > \lambda_p/\lambda > 1.5$ and to transmit 97 percent where $1.2 > \lambda_p/\lambda > 0.5$. The substrate has a refractive index $n > 1.85$. The filter is to have an entrance medium of air.

Two materials are chosen from experience for their freedom from absorptive properties in the passband. These materials may be absorptive in the stopband and it is helpful in achieving the required low transmission in the stopband if either or both materials are absorptive in that region, but this quality is not a critical requisite of the invention. The chosen materials in the preferred embodiment have refractive indices of 3.5 and 1.38.

As a first approximation the two materials were postulated in five symmetrical periods which could be described thusly:

$$G\left(\frac{H}{2} L \frac{H}{2}\right)^5 A$$

$$G\left(\frac{H}{2} L \frac{H}{2}\right)^5 A$$

where

G is glass of index 1.85
H is $\lambda_s/4$ optical thickness of index 3.5
L is $\lambda_s/4$ optical thickness of index 1.38
A is air of index 1.00
$\lambda_s$ is the design wavelength for the stopband and is equal to $\lambda_p/2$
$\lambda_p$ is a wavelength substantially in the center of the passband.

The expression in parentheses designates a single period wherein layers of the high index material are disposed symmetrically about a layer of the low index material. Within such a period there is a first layer of high index material whose effective thickness $\phi_1 = \phi_H$ is $\lambda_p/16$. It is followed by a layer of low index material whose effective thickness $\phi_2 = \phi_L$ is $\lambda_p/8$. The next and last layer of the high index material which is again of effective thickness $\lambda_p/16$. The total effective thickness, $\tau$, of the period therefore is $\lambda_p/4$, and the ratio $$q = \frac{2\frac{\lambda_p}{16}}{\frac{\lambda_p}{8}} = 1$$

The numerals 5 following the parentheses indicates that the period is to be repeated five times between the glass substrate $G$ and the air $A$. The last layer of each period will be of equal index and thickness to the first layer of the next period.

The stack may appear as shown at the left in FIG. 1, where a first period 12 consists of a layer 14 of high index material deposited on the glass 16, a layer 18 of low index material and another layer 20 of high index material. The high index layers 14, 20 are of equal thickness $\phi_H$ which is $\lambda_p/16$ each for a total of $\lambda_p/8$ of high index material in the period. The low index layer 18 has a thickness $\phi_2$ of $\lambda_p/8$. The ratio q is unity and the value $\sigma = 2\phi_H + \phi_2$ is $\lambda_p/4$.

Figure 2:
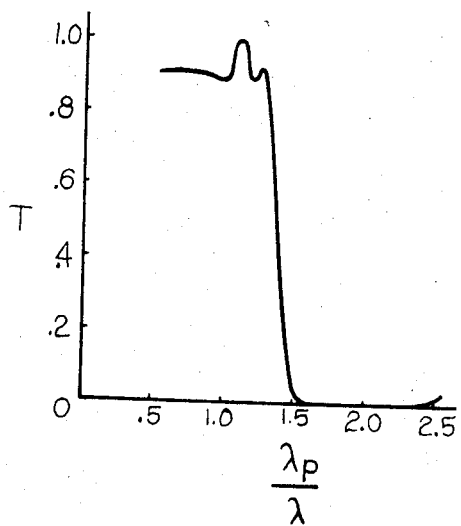
FIG. 2 is a curve of transmission against wavelength for the first postulate of FIG. 1.

This approximation yields a curve of transmission plotted against wavelength as shown in FIG. 2 which is adequate in the stopband but whose transmission in the passband region is generally too low. The passband transmission is also non-uniform, that is the curve undulates in the passband region, forming a "ripple."

Figure 3:
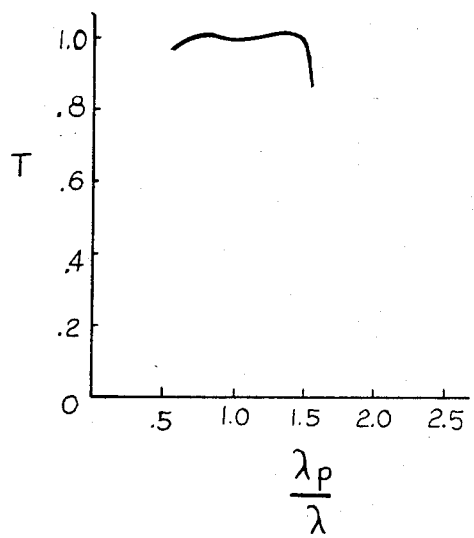
FIG. 3 is a curve of transmission against wavelength for a known antireflection coating.

FIG. 3 shows a curve which is typical of a four layer antireflection coating whose first, third and fourth layers have quarter wave thicknesses, whose second layer's thickness is one half wave and whose materials, each of which may be different, are chosen according to the constraint that: $n_1 n_4 = n_3 \sqrt{n_0 n_s}$. The notation $n_o$ is the refractive index of the incident medium, which is air; $n_1$ is the index of the next layer and the subnumeration is continued in increasing order of layers toward the substrate whose index is $n_s$. No particular constraint is placed on the index of the second layer by this formula and it is left as a variable. Variations in the shape of the curve result from changes in $n_2$ and those skilled in the art will appreciate that relatively little experimentation in substituting various values of $n_2$ will lead to an optimized design. For a detailed discussion of this antireflection coating, see Hass and Thun, supra, pp. 272 et seq.

The curve of FIG. 3 may be observed to give a generally high level of transmission in the desired passband. It also displays a good uniformity across the band which is to say it is free from ripple.

Figure 4:
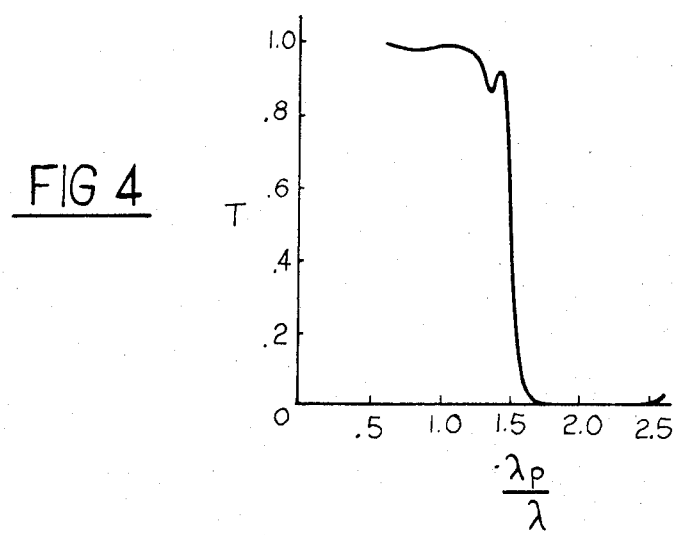
FIG. 4 is a curve of transmission against wavelength for a coating according to the invention.

In order to apply the above formula to the filter design problem at hand, there are several ways by which the equivalent refractive indices might be made to conform to the relationships specified in the formula. One way might be to change the stopband design wavelengths $\lambda_s$ for each period as has been suggested by Thelen, "Equivalent Layers in Multilayer Filters," 56 J.O.S.A. 1533 (November 1966). This invention establishes, however, that an exceptionally effective way of adjusting the equivalent indices N is to hold constant the $\sigma$ value of each period at $\lambda_p/4$, which means that the same $\lambda_p$ is retained throughout the design procedure. Since a constant relationship exists between $\lambda_s$ and $\lambda_p$, $\lambda_s$ remains unchanged in this design procedure. So, while holding the $\sigma$ value constant, the value of $q$ is varied, that is, the relative thicknesses of the inner and outer layers are varied, the periods always retaining their symmetry to bring about the requisite changes in equivalent refractive index of the periods. A resulting design is illustrated at the right of FIG. 1. As may there be seen, each period 12 on the right side has the same effective thickness, $\sigma = \lambda_p/4$, as do the periods of the left side. The high index layers 14, 20 in the right side are of equal thicknesses, but the ratio of their sum to the low index layer 18 thickness has changed. The resulting transmission curve is given in FIG. 4, and it may be seen to satisfy the design requirement.

Figure 5:
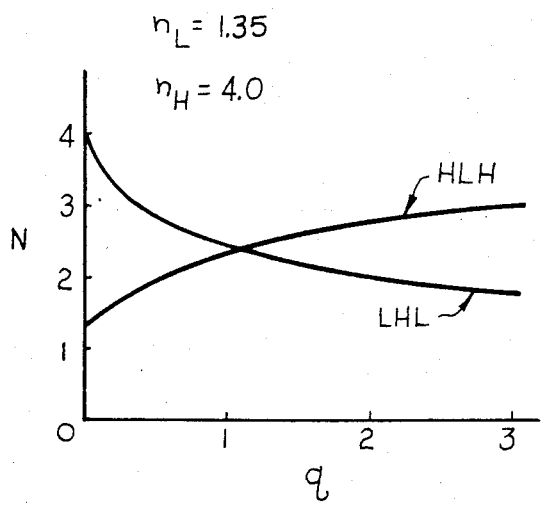
FIG. 5 is a graph showing the change of effective refractive index N at $\lambda_p$ for a period with changes in the ratio $q$ when the effective thickness $\sigma$ is held constant.

An example of the change of refractive index $N_{\lambda_p}$ 09 with changes of $q$ while $\sigma$ is held constant is shown in FIG. 5, where the low index was 1.35 and the high index was 4.0. Two curves are plotted in FIG. 5, one of which illustrates the behavior of periods of the kind having the low index layer inside, HLH, and the other having the high index inside, LHL. The data for FIG. 5 is taken from the Berning article, supra. The invention may be applied to periods of either kind as well as to periods having intermediate layers between the high and low layers. The invention may be further applied where $\lambda_s \neq \lambda_p/2$, but where several $\lambda_p$'s can be greater and/or less than $\lambda_s$. In addition, the invention may be applied where several $\lambda_p$'s may be both greater and less than $\lambda_s$.

When a value of $q$ has been chosen, for example by inspection of a graph such as the one in FIG. 5, the values of $\phi_1$ and $\phi_2$ may be readily determined from the following formulas:

$$\phi_1 = q\sigma/2(q+1)$$
$$\phi_2 = \sigma/Q+1$$

It may further be observed from FIG. 5 that the period equivalent indices N, as varied by changes in $q$, range between the indices $n$ of the high index and low index materials of the period. If one were desirous of a wide range of indices N, therefore, one might choose materials of widely separated indices.

What is claimed is:
1. An improved multilayer filter for a stopband and a passband comprising a stack of successive thin films on a substrate, said films consisting of one of at least first and second materials of different refractive indices;
  said films being arranged in periods in each of which an optical thickness $\phi_2$ of said second material is disposed symmetrically between two equal optical thicknesses $\phi_1$ of said first material, said optical thicknesses defining a ratio $q = 2\phi_1/\phi_2$ and a total optical thickness $\sigma = 2\phi_1 + \phi_2$ and each said period having an equivalent refractive index N which is a function of $q$ for any $\sigma$;

said periods being arranged in said stack with each period having a value of the ratio $q$ such that its equivalent refractive index N is equal to the refractive index $n$ of the corresponding layer of a predetermined multi-layer antireflection coating and each of said periods having the same value of $\sigma$.

2. The filter of claim 1 wherein said predetermined antireflection coating is of the formula $$n_1 n_4 = n_3 \sqrt{n_o n_s}$$

wherein $n$ is the refractive index of each layer and the layers are subnumerated in ascending order from the first massive medium $o$ toward the massive substrate $s$.

* * * * *